United States Patent [19]

Koizumi et al.

[11] Patent Number: 4,797,759
[45] Date of Patent: Jan. 10, 1989

[54] TAPE RECORDER MODE SELECTOR DEVICE FOR PLURAL CASSETTE TAPES

[75] Inventors: Satoru Koizumi; Daisuke Teshima; Yoshio Katayama, all of HigashiHiroshima, Japan

[73] Assignee: Sharp Kabushiki Kaisha, Osaka, Japan

[21] Appl. No.: 911,150

[22] Filed: Sep. 24, 1986

[30] Foreign Application Priority Data

Sep. 26, 1985 [JP] Japan .................................. 60-213520

[51] Int. Cl.⁴ .............................................. G11B 15/68
[52] U.S. Cl. ........................................ 360/92; 360/91
[58] Field of Search ................. 360/92, 15, 91, 93-94, 360/105; 242/197-201, 193

[56] References Cited

U.S. PATENT DOCUMENTS

| | | | |
|---|---|---|---|
| 3,999,219 | 12/1976 | Andrews | 360/92 |
| 4,029,269 | 6/1977 | Clarridge | 242/201 |
| 4,230,909 | 10/1980 | Baum | 360/12 |
| 4,396,803 | 8/1983 | Hashimoto | 360/92 |
| 4,551,775 | 11/1985 | Koizumi et al. | |

FOREIGN PATENT DOCUMENTS

2802255  8/1978  Fed. Rep. of Germany.
0084061  6/1980  Japan ..................................... 360/92

Primary Examiner—Stuart N. Hecker
Assistant Examiner—David J. Severin
Attorney, Agent, or Firm—Birch, Stewart, Kolasch & Birch

[57] ABSTRACT

A tape recorder mode selector device equipped with a set of mode selecting members for operations such as record, play, fast-forward and rewind, a tape selector member and a capstan for selectively driving one of a plurality of cassette tapes loaded parallel to one another thereon. A tape selecting slide member interlocking with the tape selector member includes a projection or engaging element. A rotator selector is provided. The engaging element blocks the pinch rollers for the cassette tapes other than the cassette tape selected by the tape selector member from being pressed against the capstan, and the rotator selector causes a fast rotator to be selectively engaged with a fast-forwarding or rewinding reel rest of the selected cassette tape, thereby driving the selected cassette tape in response to the selection of these operating modes.

3 Claims, 4 Drawing Sheets

TAPE RECORDER MODE SELECTOR DEVICE FOR PLURAL CASSETTE TAPES

BACKGROUND OF THE INVENTION

The present invention relates to a mode selector device of a tape recorder in which a plurality of cassette tapes can be loaded parallel to one another.

The conventional tape recorder of this type is equipped with a record, play, fast-forward, rewind and other operation buttons for each of a plurality of cassette tapes loaded in the tape recorder, and is provided with mode selecting mechanism for each set of the operation buttons.

This means that sets of mode selecting operation buttons and mode selecting mechanisms must be provided for each of the cassette tapes loaded in the tape recorder. This results in complicated construction and an increase in the number of required parts. Consequently, the tape recorder is of high cost and bulky. To make matters worse, operability is impaired because of the increased number of operation buttons.

SUMMARY OF THE INVENTION

In view of the foregoing, the object of the present invention is to provide a tape recorder mode selector device which is provided with a set of mode selecting operation members common to multiple cassette tapes and a tape selector for selecting a desired cassette tape to be driven.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above object, the mode selector device of an embodiment of the present invention comprises mode selecting operation means including record, play, fast-forward and rewind members, tape selector means and a common capstan for a plurality of cassette tapes loaded parallel to one another, wherein a tape selecting slide member communicates with the tape selector and has engaging means and a rotator selector, said engaging means blocking the pinch rollers for the cassette tapes other than the cassette tape selected by the tape selector from being pressed against the capstan, and said rotator selector causing a fast rotator to be selectively engaged with a fast-forwarding or rewinding reel rest of the selected cassette tape, whereby the plurality of cassette tapes are driven by using operation members.

According to the present invention, when a desired cassette tape has been selected by the tape selector, depression of the record or play button will cause the engaging means of the tape selecting slide member to prevent the pinch rollers for the cassette tapes other than the selected tapes from being operated. Consequently, the pinch roller for the selected cassette tape alone is pressed through the selected cassette tape against the capstan, thus driving the selected cassette tape for recording or reproduction.

Due to the rotator selector of the tape selecting slide member, the fast rotator is positioned facing the winding and feeding reel rests of the selected cassette tape. Accordingly, when the fast-forward or rewind button is depressed, the fast rotator comes in engagement with either the winding reel rest or the feeding reel rest, causing the reel rest of the selected cassette tape to rotate at a high speed for rewinding or fast-forwarding operation.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

In the tape recorder of an embodiment of the present invention, a plurality of cassette tapes are loaded coaxially in a pile and all or at least one of the plurality of cassette tapes are driven by a single capstan. The invention is described in the following on the assumption that the tape recorder can accommodate two cassette tapes.

Figure 1:
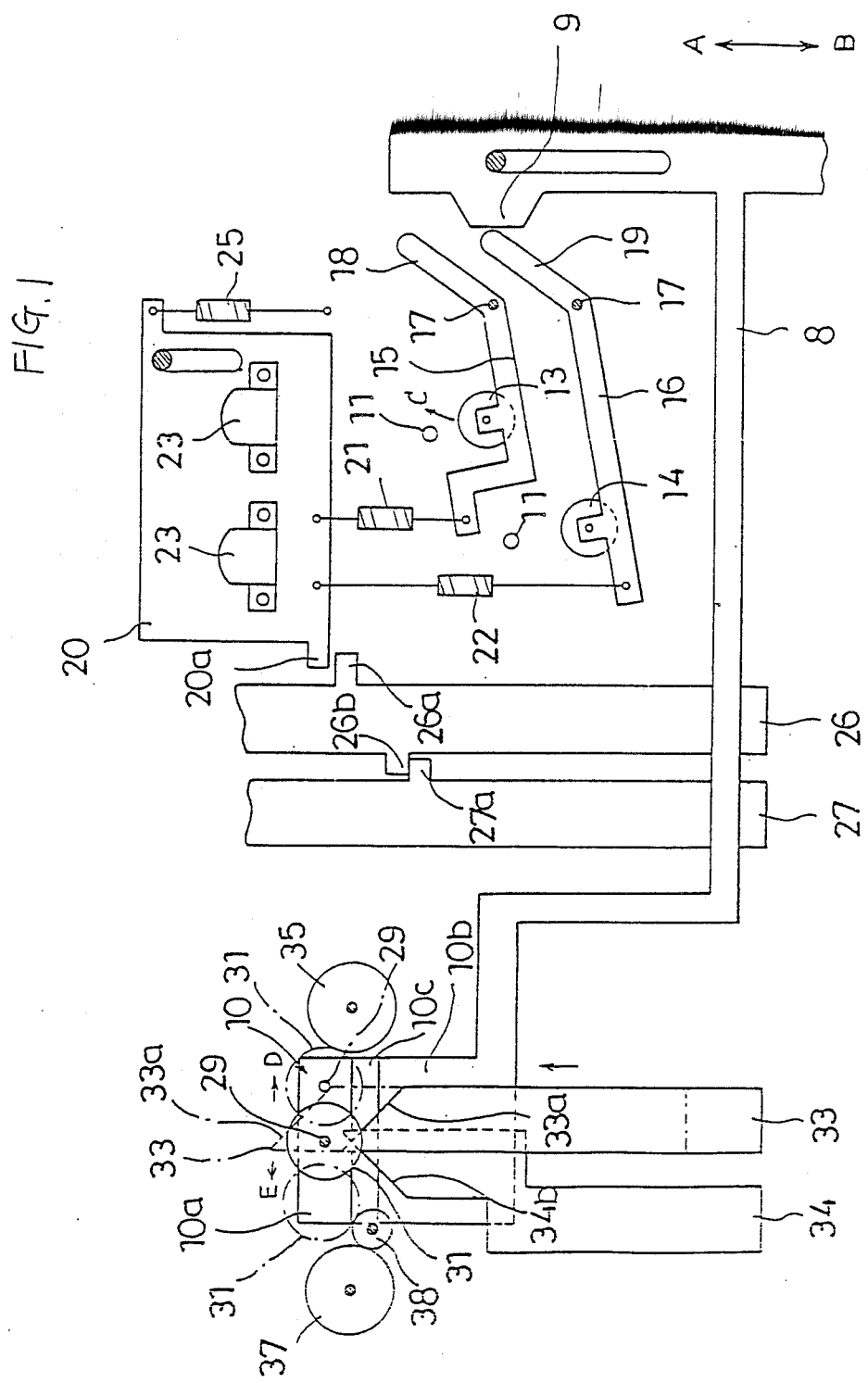
FIGS. 1 and 2 are a plan view showing the general construction of an embodiment of the tape recorder mode selector device and a side view showing the selection mechanism of a fast-forwarding or rewinding fast rotator, respectively, of the present invention in which a first cassette tape is selected.
Figure 2:
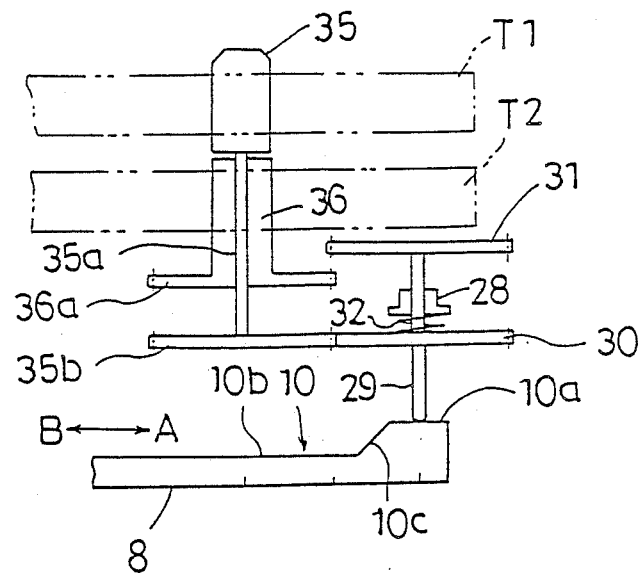
Figure 3:
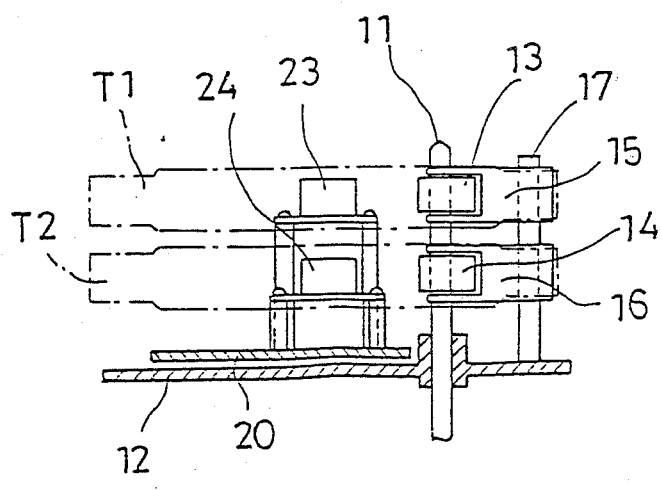
FIG. 3 is a front view of a part of the present invention.
Figure 6:
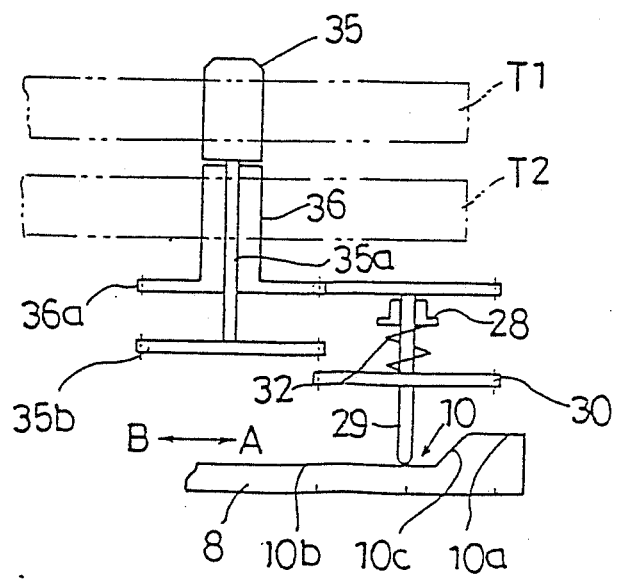
FIGS. 5 and 6 are a plan view showing the general construction of the mode selector device and a side view showing the selection mechanism of the fast rotator, respectively, of the present invention in which a second cassette tape is selected.

FIGS. 1 through 6 show an embodiment of the present invention. In this embodiment, as shown in FIGS. 2, 3 and 6, two cassette tapes $T_1$ and $T_2$ are loaded in the tape recorder.

Figure 4:
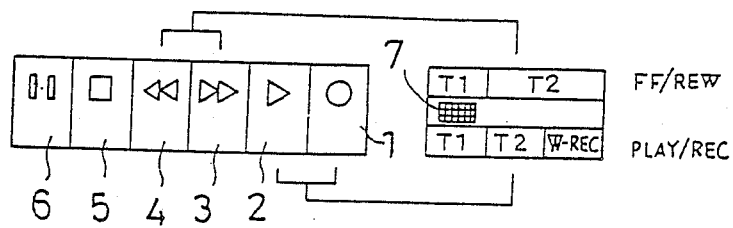
FIG. 4 shows the layout of operation buttons and a tape selector button.

The operating section is described first. As shown in FIG. 4, a set of buttons including a record button 1, a play button 2, a fast-forward button 3, a rewind button 4, a pause button 6 and a stop/eject button 5 is provided as mode selecting operation buttons for the two cassette tapes $T_1$ and $T_2$. A tape selector button 7 is also provided in the operating section.

FIGS. 1 and 2 are a plan view and a side view, respectively, showing the general construction of the present invention in the stop state, with the first cassette tape $T_1$ selected by the tape selector button 7. Referring to FIGS. 1 and 2, a tape selecting slide member 8 can move in the directions A and B by means of lever mechanism (not shown) when the tape selector button 7 is operated. The tape selecting slide member 8 has a projection 9 at a position corresponding to pinch rollers (described later) so as to restrict the operation of the pinch rollers, and a rotator selector 10 at a lower position corresponding to a fast rotator (described later). The rotator selector 10 comprises a raised portion 10a, a lower portion 10b and a slope 10c connecting the raised portion 10a with the lower portion 10b, as shown in FIG. 2. One capstan 11 is provided facing the two cassette tapes $T_1$ and $T_2$, and rotatably supported by and perpendicularly to a main chassis 12, as shown in FIG. 3. For convenience in description, the capstan 11 is shown at two positions in FIG. 1 as if there were two capstans. Two pinch rollers 13 and 14 are vertically arranged facing the tapes $T_1$ and $T_2$, respectively, as shown in FIG. 3 so that they are pressed through the tapes $T_1$ and $T_2$ against the capstan 11. Roller rods 15 and 16 having the pinch rollers 13 and 14, respectively, are rotatably supported by a supporting shaft 17 perpendicularly fixed on the main chassis 12, so that they are rotatable by a lever mechanism with the supporting shaft 17 as a fulcrum. Engaging arms 18 and 19 extend from the roller rods 15 and 16, respectively, and face the projection 9 described earlier. In FIG. 1, for easy understanding of the construction, the pinch rollers 13 and 14 which are arranged vertically in the actual device are shown as if they were arranged horizontally and therefore, the supporting shaft 17 is shown at two positions as if there were two supporting shafts.

The ends of the roller rods 15 and 16 are connected via coil springs 21 and 22 with a sub-chassis 20 which is movable in the directions A and B. The sub-chassis 20 is provided with magnetic heads 23 and 24 facing the cassette tapes $T_1$ and $T_2$ as shown in FIG. 3. Each of the magnetic heads 23 and 24 comprises two heads one for erasing and the other for recording or reproduction as shown in FIG. 1. The sub-chassis 20 is always pulled by a spring 25 in the direction B but it moves in the direction A as a projection 20a of the sub-chassis 20 is pushed by a projection 26a of a reproducing slide member 26 which moves in the direction A when the play button 2 is depressed. The sub-chassis 20 also moves in the direction A upon depression of the record button 1, for the projection 27a of a recording slide member 27 comes in contact with a projection 26b on the opposite side from the projection 26a of the reproducing slide member 26, pushing the sub-chassis 20 through the reproducing slide member 26 as the recording slide member 27 moves in the direction A.

Now, description is made of a fast-forward/rewind mode selecting mechanism shown in the left of FIG. 1 and in FIG. 2. Referring to FIG. 2, a fast rotation shaft 29 is rotatably supported by a bearing 28 in such a manner that it moves in vertical directions. A first tape fast rotator 30 and a second tape fast rotator 31 which are made of gears are fixed on the fast rotation shaft 29 each at a specified interval from the bearing 28. The fast rotation shaft 29 is always forced downwardly by a compression spring 32 mounted between the bearing 28 and the first tape fast rotator 30, so that the end of the fast rotation shaft 29 is kept in contact with the rotator selector 10 of the tape selecting slide member 8. As shown in FIG. 1, a fast-forwarding slide member 33 and a rewinding slide member 34 that are shifted in the direction A upon depression of the fast-forward button 3 and the rewind button 4, respectively, have inclined end faces 33a and 34a whose slopes are directed opposite to each other. When the fast-forwarding slide member 33 is shifted in the direction A, the fast rotation shaft 29 moves in the direction D as depressed by the inclined end face 33a. Similarly, when the rewinding slide member 34 is shifted in the direction A, the fast rotation shaft 29 moves in the direction E as depressed by the inclined end face 34a. The tape winding reel rests are provided on the side D and the tape feeding reel rest on the side E of the fast rotation shaft 29. As shown in FIG. 2, a first tape winding reel rest 35 has a rotation shaft 35a integral with the reel rest 35. A passive gear 35b is fixed on the lower end of the rotation shaft 35a. A second tape winding reel rest 36 which has a passive gear 36a at its lower end is retained rotatably by the rotation shaft 35a. Therefore, when the fast rotationshaft 29 moves to the winding side as the fast-forwarding slide member 33 moves in the direction A as indicated by chain lines in FIG. 1, the fast rotator 30 or 31 selected by the rotator selector 10 comes in engagement with the corresponding passive gear 35b or 36a. Similarly to the winding reel rests, a first and a second tape feeding reel rests (not shown) on the feeding side are also provided with passive gears. Only a passive gear 37 for the first tape is shown in FIG. 1. Actually, another passive gear for the second tape is provided above and in parallel to the passive gear 37 by the same construction as on the winding side. Since it is necessary to rotate the tape feeding reel rests in the reverse direction from the rotation of the winding reel rests 35 and 36, an intermediate gear 38 is kept in engagement with the passive gear 37 for reverse rotation. When the fast rotation shaft 29 moves to the winding side as the rewinding slide member 34 is shifted in the direction A, the fast rotator 30 or 31 selected by the rotator selector 10 comes in engagement with the corresponding intermediate gear 38 as shown by chain lines in FIG. 1.

Figure 5:
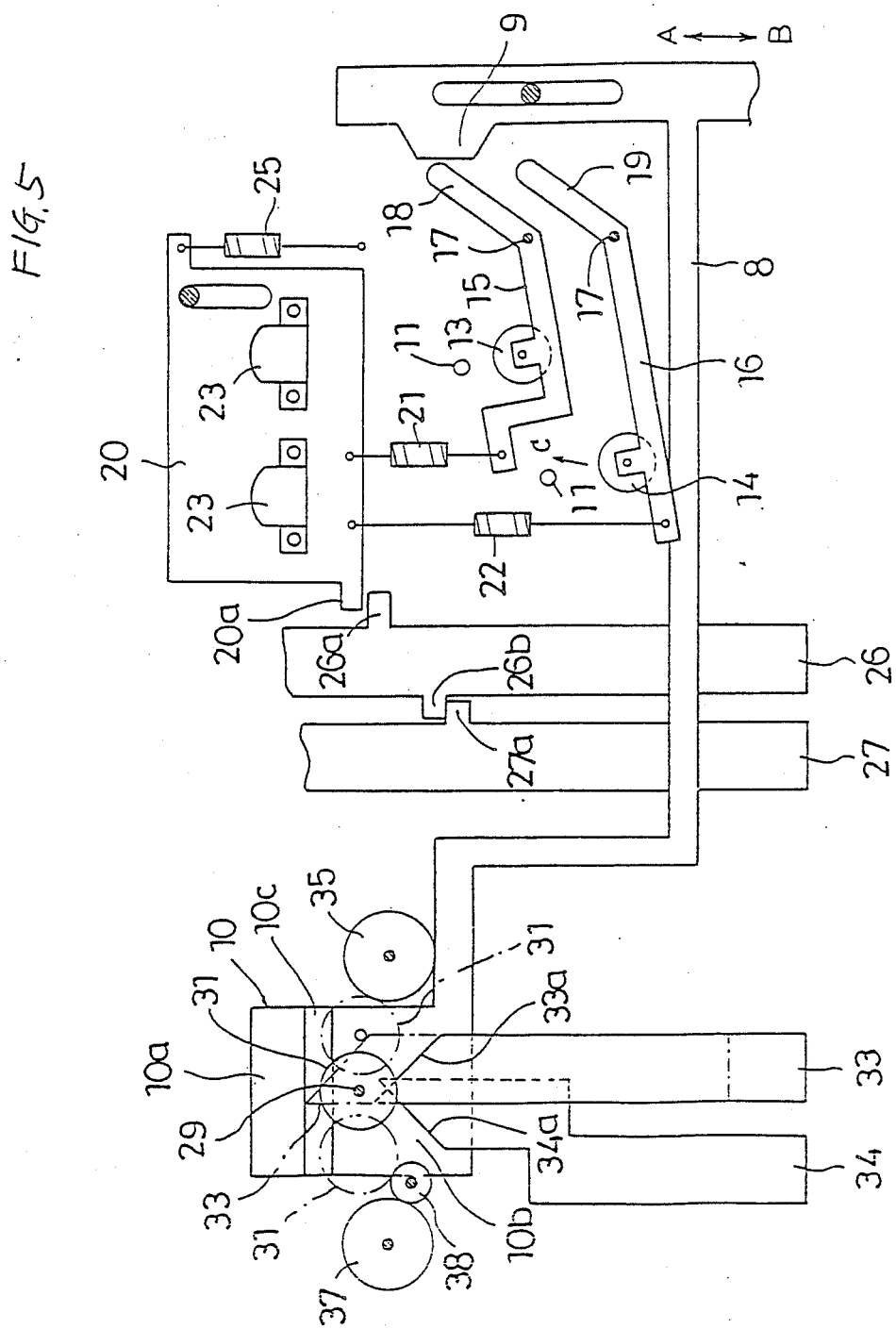

FIGS. 5 and 6 are a plan view and a side view, respectively, of the mode selector device of the present invention in which the second tape $T_2$ is selected by the tape selector button 7. The same parts as shown in FIGS. 1 through 4 are allotted with the same reference numbers.

Now, the operation of the mode selector device of the present invention is described below.

When the first tape $T_1$ is selected by the tape selector button 7 as shown in FIG. 4, the projection 9 of the tape selecting slide member 8 comes at the position facing the engaging arm 19 of the second tape pinch roller 14 as shown in FIG. 1. If the play button 2 or the record button 1 is depressed with this state, the reproducing slide member 26 or the recording slide member 27 together with the reproducing slide member 26 moves in the direction A, sliding the sub-chassis 20 in the direction A, thus applying tension through the springs 21 and 22 to the roller rods 15 and 16, respectively. Since the arm 19 of the second tape roller rod 16 is in contact with the projection 9, the second tape roller rod 16 is blocked from rotation with the spring 22 being expanded. Therefore, the first tape roller rod 15 alone rotates in the direction C around the supporting shaft 17, so that the first tape pinch roller 13 is pressed through the first tape $T_1$ against the capstan 11. As a result, the first tape $T_1$ is driven for reproduction or recording by the magnetic head 23.

When the second tape $T_2$ is selected by the tape selector button 7, the projection 9 of the tape selecting slide member 8 shifts one step in the direction A, coming at the position facing the engaging arm 18 of the first tape pinch roller 13, as shown in FIG. 5. If the play button 2 or the record button 1 is depressed with this state, the reproducing slide member 26 or the recording slide member 27 together with the reproducing slide member 26 moves in the direction A, sliding the sub-chassis 20 in the direction A, thus applying tension through the springs 21 and 22 to the roller rods 15 and 16, respectively. This time, since the arm 18 of the first tape roller rod 15 is in contact with the projection 9, the first tape roller rod 15 is blocked from rotation with the spring 21 being expanded. Therefore, the second tape roller rod 16 alone rotates in the direction C around the supporting shaft 17, so that the second tape pinch roller 14 is pressed through the second tape $T_2$ against the capstan 11. As a result, the second tape $T_2$ is driven for reproduction or recording by the magnetic head 24.

When the first tape $T_1$ is selected by the tape selector button 7 and when the tape selecting slide member 8 is positioned as shown in FIG. 1, the fast rotation shaft 29 rides on the raised portion 10a of the rotator selector 10 of the tape selecting slide member 8, so that the fast rotation shaft 29 is pushed upwardly against the force of the spring 32. As a result, the first tape fast rotator 30 is positioned on the same level as the first tape passive gear 35b and the first tape intermediate gear 38 as shown in FIG. 2. When the fast-forward button 3 or the rewind button 4 is depressed with this state, the fast-forwarding slide member 33 or the rewinding slide member 34 moves in the direction A of FIG. 1 so that the fast rotation shaft 29 shifts in the direction D or E of FIG. 1 as pushed by the inclined end face 33a or 34a of the fast-forwarding or rewinding slide member 33 or 34. As a result, of the two fast rotators 30 and 31 integral with the fast rotation shaft 29, only the first tape fast rotator 30 comes in engagement with the first tape passive gear 35b or the first tape intermediate gear 38 as indicated by chain lines in FIG. 1. Consequently, the first tape winding reel rest 35 is made to rotate rapidly in the forward direction for fast-forwarding the first cassette tape $T_1$, or the first tape feeding reel rest is made to rotate rapidly in the backward direction, through the first tape passive gear 37, for rewinding the first cassette tape $T_1$.

When the second tape $T_1$ is selected by the tape selector button 7 and when the tape selecting slide member 8 is positioned as shown in FIG. 5, the fast rotation shaft 29 rides on the lower portion 10b of the rotator selector 10 of the tape selecting slide member 8, so that the fast rotation shaft 29 is pushed downwardly by the force of the spring 32. As a result, the second tape fast rotator 31 is positioned on the same level as the second tape passive gear 36a and the second tape intermediate gear (not shown). When the fast-forward button 3 or the rewind button 4 is depressed with this state, the second cassette tape $T_2$ is fast-forwarded or rewinded by completely the same mechanism as the first cassette tape $T_1$.

The present invention is not limited by the above embodiment. Various modifications are possible without departing from the scope of the invention. For instance, the tape recorder of the present invention may be capable of accommodating three or more cassette tapes. In such a case, it is only necessary to increase the number of projections 9 and the number of steps of the rotator selector 10 in accordance with the number of cassette tapes. The fast rotators 30 and 31, the passive gears 35b and 37 and the intermediate gear 38 may be replaced by rollers.

As obvious from the above, the tape recorder mode selector device of the present invention selects record, play, fast-forward, rewind or other mode for a plurality of cassette tapes by using a set of mode selectors and a tape selector. Therefore, operation-ability is remarkably improved and the construction is substantially simplified. This results in smaller number of required parts and lower cost.

While only certain embodiments of the present invention have been described, it will be apparent to those skilled in the art that various changes and modifications may be made therein without departing from the spirit and scope of the present invention as claimed.

What is claimed is:

1. A tape recorder comprising:
   a cassette tape compartment for detachably housing a plurality of cassette tapes,
   a capstan on which said plurality of cassette tapes housed in said tape compartment are coaxially loaded,
   a separate roller means for driving each of said plurality of cassette tapes, each of said roller means being mounted so that it can be pressed against said capstan,
   a single control means for selecting a cassette tape to be driven by said roller means,
   means for selecting one of a plurality of cassette tape drive modes, said mode selecting means comprising a record button, a play button, a fast forward button, a rewind button and a stop button, each of said buttons actuating a drive mode for any selected cassette tape,
   said single control means including a tape selecting member,
   said tape selecting member including means for placing the roller means for driving any non-selected tape in a non-driving position spaced from said capstan, and
   fast rotator means alternatively positionable for causing the selected cassette to rotate at a high speed for a rewinding operation or for a fast-forwarding operation.

2. The tape recorder of claim 1 wherein said tape selecting member is a slide member and said placing means is a projection.

3. A tape recorder mode selector device comprising means for selecting one of a plurality of cassette tape drive modes,
   a capstan for a plurality of cassette tapes loaded parallel to one another,
   a separate roller means for driving each of said plurality of cassette tapes,
   a single control means for selecting a cassette tape to be driven by said roller means,
   said single control means including a tape selecting slide member,
   said slide member having engaging means for blocking the movement of said roller means of non-selected cassette tapes so that said non-selected tapes will not be driven, a fast rotator means selectively engageable with a fast-forwarding or rewinding reel rest of any selected cassette tape, and
   said fast rotator means including a rewinding slide member, a fast forwarding slide member and a fast rotation shaft.

* * * * *